United States Patent Office 2,841,524
Patented July 1, 1958

2,841,524

ADDUCTS OF TRITHIANE WITH SULFENYL CHLORIDES AND PHOSPHITES

Gail H. Birum, Dayton, Ohio, assignor to Monsanto Chemical Company, St. Louis, Mo., a corporation of Delaware No Drawing. Application November 25, 1955
Serial No. 549,201

19 Claims. (Cl. 167—33)

This invention relates to new organic phosphorus compounds, and more particularly to compounds having insecticidal properties which are prepared by reacting trivalent phosphorus acid esters with adducts of trithiane and a sulfenyl halide, to the method of preparing the same, and to compositions and methods employing these compounds for the control of insects.

It is an object of the present invention to provide new and useful compounds of phosphorus. It is a further object of the invention to provide a new class of highly useful insecticides. Still another object of this invention is to provide a method of preparation of new and useful insecticides. These and other objects of the invention are further described below.

In my copending application, Serial No. 543,265, filed October 27, 1955, now U. S. 2,774,707, assigned to the same assignee as the present invention, I have disclosed that trithiane reacts with chloro- and/or nitro-substituted sulfenyl halides to give adducts which contain from 1 to 3 moles of sulfenyl halide per mole of trithiane and which are valuable biological toxicants. I have now found that these adducts can be reacted with trivalent phosphorus acid esters to give new products which are highly effective biological toxicants and specifically, possess valuable insecticidal properties.

The preparation of the trithiane-sulfenyl halide adducts which are further reacted in accordance with the present invention is described in detail in my copending application referred to hereinabove, the subject matter of which is incorporated herein by reference. As explained in the said application, I have found that one mole of trithiane reacts with from one to three moles of a chloro- and/or nitro-substituted sulfenyl halide to form the stable adducts which are used as starting materials for the process of the present invention. Probably the reaction product of my earlier disclosure is a mixture of 1:1, 2:1, and 3:1 sulfenyl halide-trithiane adducts; I have not been able to define the structure of these compounds more accurately.

The sulfenyl halides which form the said adducts with trithiane are sulfenyl chlorides of the formula R'SCl in which R' is a hydrocarbon radical of from one to eight carbon atoms which is free of non-benzenoid unsaturation and which contains at least one substitutent selected from the class consisting of halogen and the nitro radical. (By non-benzenoid unsaturation is meant carbon-to-carbon, olefinic and acetylenic unsaturation.)

Examples of presently useful halogen-substituted hydrocarbon sulfenyl halides are 2-, 3- or 4-chlorobenzenesulfenyl chloride, 2,3-, 3,4-, or 2,4-dibromobenzenesulfenyl chloride, 2-, 3-, or 4-fluorobenzenesulfenyl chloride, 2-, 3-, or 4-iodobenzenesulfenyl chloride, pentachlorobenzenesulfenyl chloride, 2-chloro-4-ethylbenzenesulfenyl chloride, trichloro-o-xylenesulfenyl chloride, 3-chloro-4-n-propylbenzenesulfenyl chloride, trichloromethanesulfenyl chloride, dichloromethanesulfenyl chloride, monochloromethanesulfenyl chloride, 2-chlorocyclohexanesulfenyl chloride, 2-iodoethanesulfenyl chloride, 2-chloroethane sulfenyl chloride, etc. Examples of useful nitro-substituted hydrocarbon sulfenyl chlorides are 2-, 3-, or 4-nitrobenzenesulfenyl chloride, 2-nitro-4-methylbenzenesulfenyl chloride, 2,4-dinitro-3-ethylbenzenesulfenyl chloride, 2-nitro-3,4-dimethylbenzenesulfenyl chloride, 2-nitropropanesulfenyl chloride, etc. Examples of presently useful hydrocarbon sulfenyl halides having both nitro and halogen substituents are 4-chloro-2-nitrobenzenesulfenyl chloride and (2-chloro-4-nitrophenyl)methanesulfenyl chloride.

In order to facilitate understanding of the present invention, the preparation of adducts of trithiane with several sulfenyl halides is described below:

Example 1

In a 500 ml. 3-neck flask equipped with a stirrer, dropping funnel and a calcium chloride protected condenser were placed 69 grams (0.5 mole) of trithiane and 186 grams (1.0 mole) of perchloromethyl mercaptan (trichloromethanesulfenyl chloride). The mixture was maintained at 110–125° C. for one hour. After removal of material boiling up to 44° C. at 10 mm. (pot temperature 135° C.), there were obtained as residue 183.6 grams of the red-brown liquid adduct, which analyzed 37.53 percent sulfur, and 48.53 percent chlorine. The lower boiling material previously removed from the flask, containing unreacted perchloromethyl mercaptan weighed 65 grams. The present adduct is thus one in which 1 mole of the trithiane is combined with about 1.3 moles of perchloromethyl mercaptan.

Example 2

Monochloromethane sulfenyl chloride was prepared by the reaction of 135 grams of sulfuryl chloride with 96 grams of methyl disulfide. To the reaction mixture, consisting essentially of 1 mole of the sulfenyl chloride, at slightly above room temperature, were gradually added 46 grams (0.33 mole) of trithiane, with external cooling and subsequent heating to about 112° C. After removal of unreacted starting material, the residue of viscous chloromethanesulfenyl chloride-trithiane adduct weighed 86.5 grams.

Example 3

This example describes the reaction of trithiane with 4-chlorobenzenesulfenyl chloride to form a 1:3 adduct.

Into a 500 ml. four-neck flask equipped with stirrer, thermometer, dropping funnel and condenser there were placed 27.6 grams (0.2 mole) of trithiane, 150 ml. of toluene, and 107.4 grams (0.6 mole) of 4-chlorobenzenesulfenyl chloride. The mixture was then heated to 105–120° C. and held at this temperature for 2.5 hours. On vacuum distillation, only about 7.0 grams of distillate were obtained up to 81° C./0.1 mm. (pot temperature, 120° C.); the residue consisted of 119.2 grams of the red, liquid 4-chlorobenzenesulfenyl chloride-trithiane adduct, analyzing 27.90 percent chlorine and 29.39 percent sulfur, which value shows addition of 1 mole of trithiane with 3 moles of the chlorobenzenesulfenyl chloride.

Example 4

This example describes the preparation of a trithiane-4-chlorobenzenesulfenyl chloride adduct in which about 1.5 moles of the sulfenyl chloride is combined per mole of trithiane.

To a solution of 20.7 g. (0.15 mole) of trithiane in 150 ml. of benzene was gradually added, over a period of 12 minutes, 53.7 g. (0.30 mole) of 4-chlorobenzenesulfenyl chloride. The mixture was then refluxed for an hour and a half. Removal of distillable material to a pot temperature of 90° C./0.1 mm. gave 72 grams of red, liquid adduct, which on elemental analysis was found to contain 24.96 percent chlorine and 37.55 percent carbon.

*Example 5*

Employing the apparatus described in Example 3, a mixture consisting of 20.7 grams (0.15 mole) of trithiane, 57.0 grams (0.3 mole) of 2-nitrobenzenesufenyl chloride and 200 ml. of benzene was refluxed for 4.5 hours. Benzene was then distilled from the reaction mixture and refluxing was continued at 106° C. for 2.5 hours. Concentration of the resulting reaction mixture to a pot temperature of 85° C./12 mm. gave as residue 77.3 grams of the viscous, yellow 2-nitrobenzenesulfenyl chloride-trithiane adduct.

In accordance with the present invention, adducts of trithiane with sulfenyl chlorides prepared in accordance with my earlier application identified above, as illustrated by the above examples, are reacted with esters of trivalent phosphorus acids.

Particularly preferred in the present application are phosphorus esters of the formula

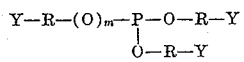

wherein $m$ is a cardinal number not greater than one, R is a bivalent hydrocarbon radical free of non-benzenoid unsaturation containing from one to ten carbon atoms, and Y is selected from the class consisting of hydrogen and chlorine atoms.

Examples of one class of trivalent esters of the above formula and suitable for use in the process of the present invention are tertiary phosphite esters in which the ester groups are hydrocarbon radicals (Y in the above formula is equal to hydrogen), such as trialkyl phosphites, e. g., trimethyl phosphite, triethyl phosphite, tri-n-propyl phosphite, triisopropyl phosphite, triisobutyl phosphite, tri-tert-butyl phosphite, diethyl isopropyl phosphite, methyl ethyl n-propyl phosphite, etc.; aryl and alkaryl phosphites such as phenyl diethyl phosphite, phenyl di-n-propyl phosphite, di-p-tolyl tert-butyl phosphite, 2,4-xylyl dimethyl phosphite, 1-naphthyl phenyl ethyl phosphite, di-2-biphenylyl ethyl phosphite, diphenyl butyl phosphite, diphenyl propyl phosphite, etc.; aralkyl phosphites such as triphenethyl phosphite, diethyl phenethyl phosphite, 3-phenylpropyl di-n-propyl phosphite, tribenzyl phosphite, benzyl diisobutyl phosphite, etc.; and cycloalkyl phosphites such as cyclohexyl diethyl phosphite, dicyclohexyl methyl phosphite, etc.

Another class of tertiary phosphite esters useful in the process of this invention comprises phosphorus acid esters in which the substituent designated "Y" in the above formula is a chlorine atom. Examples of such esters are chloroalkyl phosphites such as tris(2-chloroethyl) phosphite, tris(3-chloropropyl) phosphite, 2-chloroethyl dimethyl phosphite, 2-chloroethyl di-n-butyl phosphite, tris-(3-chlorobutyl) phosphite, tris(5-chloroamyl) phosphite, 3-chloroamyl diethyl phosphite, bis(2-chloroethyl) phenyl phosphite, tris(2-chlorobutyl) phosphite, etc.; chloroaryl phosphites such as bis(p-chlorophenyl) ethyl phosphite, o-chlorophenyl diethyl phosphite, 2-chloro-p-tolyl dimethyl phosphite, 2-chloro-m-tolyl dimethyl phosphite, 4-chloro-1-naphthyl 4-chlorophenyl 2-chloroethyl phosphite, bis(2-chloroethyl) 6-chloro-2,4-xylyl phosphite, 4'-chloro-4-biphenylyl diethyl phosphite, etc.; as well as such chlorinated phosphite esters as 4-chlorocyclohexyl di-n-propyl phosphite, p-chlorobenzyl diethyl phosphite, o-chlorophenethyl bis(2-chloroethyl) phosphite, etc.

Another class of trivalent phosphorus esters presently useful are diesters of the phosphonous acids containing a carbon to phosphorus bond, as illustrated by the above formula wherein $m$ is equal to 0. Examples of such phosphonite diesters which may be used in the reaction of the invention are alkyl phosphonite esters such as diisobutyl isobutylphosphonite, aralkyl phosphonite esters such as dibutyl benzylphosphonite, cycloalkyl phosphonite esters such as diethyl cyclohexylphosphonite, alkaryl phosphonite esters such as diethyl p-tolylphosphonite, and aryl phosphonite esters such as dimethyl phenylphosphonite, diisopropyl phenylphosphonite, diisobutyl phenylphosphonite, diamyl phenylphosphonite, etc. Also useful in the present process are chloro-derivatives of phosphorus acids corresponding to the above formula wherein $m$ is 0, such as diethyl p-chlorophenylphosphonite, bis-(2-chloroethyl) m-tolylphosphonite, diethyl 3-chloro-p-tolylphosphonite, etc.

The phosphite and phosphonite esters are readily available compounds, several of which are articles of commerce. Their preparations are described, for example, in a monograph by G. M. Kosolapoff, entitled "Organo-phosphorus Compound" (New York, Wiley, 1950).

In accordance with the present invention, a trivalent phosphorus acid ester of the above formula is reacted with an adduct of one mole of trithiane with from one to three moles of a chloro- and/or nitro-substituted sulfenyl chloride as defined hereinabove, whereby from one to five moles of the phosphorus acid ester are reacted with the said adduct per mole of the said sulfenyl chloride present in the adduct.

As explained in my earlier application referred to above, the present adducts appear to be mixtures of 1:1, 2:1, and 3:1 sulfenyl chloride-trithiane adducts. Further refinement of these adducts is difficult, because they are not easily distilled, nor is crystallization readily induced. The amount of sulfenyl chloride which has reacted with the trithiane component of the reaction mixture may be determined, however, for example, by recovery of unreacted starting materials, via distillation, extraction, etc. When these adducts are then contacted with the present trivalent phosphorus esters, I have found that a reaction takes place, the reaction generally being exothermic and accompanied by evolution of heat. There is evolved from the reaction mixture a halide of the hydrocarbon or substituted hydrocarbon radical of the ester group of the phosphorus ester. My experiments have shown that at least one, and up to five moles of the phosphorus ester may react with the adduct per mole of sulfenyl chloride present in the adduct.

In carrying out the process of the invention, the phosphorus ester is simply contacted with the trithiane-sulfenyl chloride adduct until reaction is complete. Generally, the reaction goes readily at room temperature, and the reaction mixture may even advantageously, at least initially, be cooled; it is also an advantage in moderating the reaction to add one of the reactants slowly and gradually to the other, though the reactants may alternatively be mixed all at once, preferably, though not necessarily, together with a solvent or diluent. Solvents or diluents which may be employed to moderate the reaction and/or to facilitate stirring the mixture, etc., are e. g., liquid hydrocarbons such as benzene, toluene, hexane, or kerosene, ethers such as diethyl ether or dioxane, etc. After the original exothermic reaction has subsided, the reaction mixture may be let stand at room temperature or warmed to bring it to completion, or heat may be used to accelerate the reaction or to promote the reaction of more recalcitrant compounds. Useful temperatures are, for example, the reflux temperature of the reaction mixture, where solvents are employed, or any desired temperatures below the decomposition point of the ingredients of the reaction mixture. I have found atmospheric pressure satisfactory for conducting the reaction, though sub- or super- atmospheric pressures may be used if desired. Low vacuum may usefully be applied, for example, to facilitate removal of the hydrocarbon or substituted hydrocarbon halide evolved during the reaction; the removal of the hydrocarbon halide may alternatively be accelerated by sweeping out the reactor with an inert gas, if desired. Catalysts may or may not be employed.

While I do not know the exact mechanism of the present reaction, from the evolution of chlorides of the hydrocarbon or substituted hydrocarbon moiety of the ester group of the phosphorus acid ester, I believe that the phosphorus ester may undergo an Arbuzov reaction with the active chlorine of the trithiane-sulfenyl chloride adduct. From the analyses of the reaction products and from differences between the amounts of hydrocarbon halides actually evolved and the amounts theoretically required with reference to the phosphorus ester reacted, it appears also possible that some reaction of the phosphorus ester with disulfide linkages in the trithiane adduct may occur. My experiments have shown that up to five moles of trivalent phosphorus acid ester will react with the present sulfenyl chloride-trithiane adducts per mole of sulfenyl chloride present in the adducts; excess phosphorus ester is generally recovered unchanged. The exact proportions depend on the quantities of the reactants contacted as well as on the reaction conditions. I have found that where I operate by adding the phosphorus ester to the adduct gradually, the temperature of the reaction mixture generally rises at first, and then stops rising when sufficient phosphorus acid ester has been added to react completely with the trithiane-sulfenyl halide adduct. Alternatively, I can detect completion of the reaction by noting cessation of the evolution of hydrocarbon halide (or substituted hydrocarbon halide), by detecting that no further change is occuring in the refractive index of the reaction mixture, etc. The reaction products appear to be a mixture of compounds which are best characterized by specifying the molar proportion of phosphorus acid ester reacted with the trithiane adduct per mole of sulfenyl chloride present in the adduct.

The present products of the reaction of trithiane-sulfenyl chloride adducts with trivalent phosphorus acid esters are generally stable, viscous liquids which are useful for a variety of agricultural and chemical applications and are especially useful as biological toxicants, e. g., as nematocides, fungicides, bacteriostats, and particularly, insecticides. At sufficient rates of application, moreover, the present reaction products may also be used as defoliants.

Only very low amounts of the present reaction products need be applied to produce satisfactory insecticidal results, and thus they are advantageously applied to surfaces which it is desired to protect against insect attack in the form of a composition comprising the active insecticidal substance in a carrier material, to ensure even distribution of the low concentrations required. For example, the present compounds may be incorporated in solid carriers, such as clay, talc, pumice, bentonite, etc., to give toxic compositions which may be applied as dusts; or they may be dissolved in organic solvents to give solutions to be applied as sprays. Particularly effective as a method of application are oil-in-water emulsions of the present toxicants, the word "oil" being herein used to designate any organic liquid which is insoluble in water. Such emulsions may be prepared by dissolving the reaction products of the invention in an organic liquid, such as a hydrocarbon solvent, e. g., a coal tar naphtha, adding an emulsifier thereto and diluting the resulting mixture with water to give emulsions containing, e. g., 0.1 to 2 percent by weight of the active ingredient. Examples of suitable emulsifying agents include long-chained alkylbenzenesulfonates, polyalkylene glycols, long-chained alkylsulfosuccinates, etc. Other water-dispersing or emulsifying agents, such as those listed in detail in Bulletin E-607 of the Bureau of Entomology and Plant Quarantine of the U. S. Department of Agriculture, may also be used.

The preparation of the present products is further illustrated by the following examples, which, however, are not intended to be limiting:

*Example 6*

A fifty-gram sample of the product of Example 1, comprising the adduct of one mole of trithiane with approximately 1.3 moles of trichloromethanesulfenyl chloride, and calculated to contain about 0.17 mole of combined trichloromethanesulfenyl chloride, was placed in a reaction flask cooled in ice. To the flask was gradually added trimethyl phosphite, the phosphite being added at the rate of about two to three drops per second while the temperature was held at below 31° C. until there was no longer an increase in temperature on addition of further phosphite ester. The total weight of phosphite added to the reaction flask was 94.5 grams (0.76 mole), which corresponds to between 4 and 5 moles of phosphite per mole of sulfenyl halide in the adduct. The reaction mixture was then slowly refluxed at 71° C. under a low vacuum until the evolution of methyl chloride had ceased. The loss of weight of the reaction mixture was 34.2 grams. The orange liquid residue, $n_D^{25}$ 1.5036, weighed 110.3 grams; elementary analysis of the liquid gave the following results: 5.04 percent chlorine, 17.44 percent phosphorus, 16.36 percent sulfur.

*Example 7*

Freshly fractionated triethyl phosphite was slowly added to a reaction flask containing 50.0 grams of the trichloromethanesulfenyl chloride-trithiane adduct of Example 1, while the temperature of the flask was held at belof 30° C. until the temperature had ceased to rise on further addition of phosphite. A total of 123 grams of triethyl phosphite (0.74 mole) was thus added over a period of about 20 minutes. The orange reaction mixture was warmed to 73° C., cooled to 50° C. and then refluxed under a low vacuum at about 50° C. until formation of ethyl chloride had ceased. The ethyl chloride which was evolved was collected in a trap and was found to weigh 33.8 grams (0.524 mole). The orange liquid residue in the reaction flask $n_D^{25}$ 1.4826, weighed 139.0 grams, and on elementary analysis was found to contain 4.60 percent chlorine, 12.45 percent phosphorus, and 13.16 percent sulfur.

Similarly, the adduct of trithiane with monochloromethanesulfenyl chloride, prepared as described in Example 2, may be reacted with triisopropyl phosphite, with evolution of isopropyl chloride, to form a reddish, liquid, insecticidal reaction product.

*Example 8*

To a twenty-gram portion of the trithiane-trichloromethanesulfenyl chloride adduct of Example 1 was gradually added, with ice cooling, 89.1 grams (0.33 mole) of tris (2-chloroethyl) phosphite, until there was no further temperature rise. The reaction mixture was warmed to 73° C., cooled to 60° C., and then refluxed under a low vacuum at 82° C. until 19.2 grams of ethylene dichloride had been collected in the condenser trap. There were obtained 89.8 grams of an orange liquid residue, $n_D^{25}$ 1.5208, the elementary analysis of which indicated that it contained 33.75 percent chlorine, 9.84 percent phosphorus, and 8.04 percent sulfur.

*Example 9*

A 39.7 gram portion of the 1:3 trithiane-4-chlorobenzene-sulfenyl chloride adduct of Example 3, dissolved in 50 ml. of benzene, was placed in a 500 ml. four-neck flask connected to a Dry Ice trap. Trimethyl phosphite was added over a period of about twelve minutes, with occasional cooling to hold the temperature below 35° C., until 24.8 grams (0.2 mole) of the phosphite ester had been added. The cooling bath was then removed, after which the temperature of the reaction flask spontaneously rose to 47° C. within a few minutes. The flask was then warmed externally at 80–92° C. for half an hour. The flask contents were distilled to remove material (benzene, methyl chloride, etc.) boiling up to 69° C./0.4 mm. (maximum pot temperature 107° C.), leaving a red liquid residue weighing 40.4 grams, $n_D^{25}$ 1.5535. On analysis, the red liquid reaction product was found to contain 18.66 percent sulfur and 11.34 percent phosphorus.

Example 10

A thirty-five gram portion of the reaction product of trithiane and 4-chlorobenzenesulfenyl chloride prepared as described in Example 4 was placed in a flask provided with a condenser and a cold trap, and 26.6 grams of triethyl phosphite (0.16 mole) was gradually added to the flask over a period of about 20 minutes, with cooling to hold the reaction mixture at 15–20° C. On removal of the cooling bath, the temperature within the reaction flask rose spontaneously to 47° C. The yellow mixture was then heated to 140–150° C. for about half an hour. A small amount of liquid was condensed in the Dry Ice trap of the condenser during the addition of the phosphite ester and subsequent heating. The flask contents were subjected to distillation to remove material boiling up to 90° C./0.8 mm., leaving 35.6 grams of a yellow liquid residue which, on elementary analysis, was found to contain 11.55 percent chlorine, 21.44 percent sulfur, and 9.2 percent phosphorus.

Similarly, the 2-nitrobenzenesulfenyl chloride-trithiane adduct of Example 5 is reacted with tri-n-butyl phosphite to give a reaction product containing phosphorus and sulfur.

Example 11

A mixture of 39.7 grams of the trithiane-4-chlorobenzenesulfenyl chloride adduct of Example 3 and 50 ml. of benzene were cooled in a flask during the gradual addition of 39.6 grams (0.2 mole) of diethyl phenylphosphonite, while the temperature was held at 26–32° C. The cooling bath was then removed and the reaction mixture was refluxed for about half an hour at around 90° C. After removal of material boiling up to 82° C./0.3 mm., there remained a red liquid residue weighing 59.2 grams, $n_D^{25}$ 1.5844.

Similarly, the adduct of 4-nitrobenzenesulfenyl chloride and trithiane may be reacted with di-n-propyl 4-methyl-3-chloro-phenylphosphonite to give a reaction product possessing biological toxicant properties.

Example 12

In this and the following examples, the reaction products of the present invention prepared as described above will be designated as follows:

*Product I.*—Product of the reaction of trimethyl phosphite with adduct of trichloromethanesulfenyl chloride and trithiane (Example 6).

*Product II.*—Product of the reaction of trimethyl phosphite with adduct of 4-chlorobenzenesulfenyl chloride and trithiane (Example 9).

*Product III.*—Product of the reaction of triethyl phosphite with adduct of trichloromethanesulfenyl chloride and trithiane (Example 7).

*Product IV.*—Product of the reaction of triethyl phosphite with adduct of 4-chlorobenzenesulfenyl chloride and trithiane (Example 10).

*Product V.*—Product of the reaction of diethyl phenylphosphonite with adduct of 4-chlorobenzenesulfenyl chloride and trithiane (Example 11).

Testing of the present products as insecticides was carried out as follows:

This method tests the contact and residual insecticidal effect of the chemicals of this invention against mites, piercing-sucking insects, e. g., aphids, and chewing larvae. Emulsions of the liquid chemicals were prepared as follows: 0.1 ml. of each of the chemicals of products I, II, III, and IV were pipetted into 200 cc. Erlenmeyer flasks. To each flask was added 0.2 ml. of "Emulsifier L," which is a commercial emulsifier described as a mixture of a polyalkylene glycol ether with a higher alcohol and a long-chained alkyl benzenesulfonate. The contents of each flask were then diluted with 100 cc. of tap water and the mixtures were thoroughly shaken to form emulsions containing 0.1 percent by volume of the insecticidal chemicals.

In a preliminary test, each of the four emulsions prepared as described above was poured into crystallizing dishes. Stems of Woods Prolific lima beans bearing cotyledon leaves previously infested with two-spotted spider mites, and uninfested Woods Prolific lima bean leaves with petioles two to three inches long were dipped into the dishes containing the chemicals. The mite tests were left in the greenhouse for 48 hours, after which it was found that 100% kill of the mobile stages had been produced with each of the four chemicals. Seven days after the treatment, the mite tests were again observed, and it was found that a complete kill of the resting stages and eggs of the mites had been obtained. As a test for the stomach poison-activity of these compounds against chewing insects, the uninfested leaves which had been dipped into the respective chemicals were allowed to dry and then placed in observation boxes, after which one of these leaves was infested with ten second instar Mexican bean beetle larvae and the second leaf was similarly infested with ten third instar Southern Army worm larvae. The observation boxes were then closed and stored at 77° F. for 48 hours. It was found that 100° kills had been obtained of the Mexican bean beetle larvae with each of the reaction products; product II also gave 100% kill of the Southern Army worm larvae.

The contact and residual insecticide action of these four chemicals was then further tested on potted bean and cucumber plants at low concentrations. One pot of bean plants previously infested with two-spotted spider mites and two uninfested pots of beans were each sprayed to run-off with emulsions of 0.05, 0.025, and 0.0125 percent concentrations of each of products I, II, III, and IV, the emulsions being prepared by dilution of the more concentrated emulsions prepared as described above. The uninfested plants were allowed to drain and dry, after which they and the mite-infested plants were placed on constant water level benches. The two uninfested bean plants at each concentration were respectively infested with ten third instar Southern Army worm larvae and with ten second instar Mexican bean beetle larvae, after which all the plants were held in the greenhouse for 48 hours. Mortality observations indicated that product II was highly active against all three of the species tested, while products I, III, and IV gave 100% kill of the chewing larvae of the Mexican bean beetle at down to the lowest emulsion concentration, as well as being highly effective against all of the life-stages of the two-spotted spider mite. Product III, for example, was found, in later tests with more dilute emulsions, to give 100% kill of spider mites at down to 0.0016% concentrations.

Example 13

In this test, plants are allowed to absorb the chemical through excised stems so that a stomach poison activity against insects may be produced in the leaves of the plants by translocation and/or by metabolization.

Two long cut stems of Woods Prolific lima beans with cotyledons and cotyledon leaves, and one stem of cucumber with cotyledon leaves were inserted into test tubes containing 0.004% concentrations of products I, II, III, and IV in the form of emulsions prepared as described in the above example. The test tubes were set in an incubation chamber for 72 hours, at the end of which time the bean leaves were excised with petioles of from two to three inches in length and placed in water-filled test tubes while the entire cucumber stems were plugged into test tubes. These assemblies were then infested with the test insects, one bean leaf being infested with two-spotted spider mites, another with ten second instar Mexican bean beetle larvae, and a third with ten third instar Southern Army worm larvae, while ten mature wingless agamic cotton aphids were placed on the cucumber cotyledons. After 48 hours at 77° F., the plants were observed and it was found that excellent insecticidal activity was obtained with each of the four chemicals against the Mexican bean beetle and the two-spotted spider mite. Product I, II, III, and IV were also quite effective toxicants against piercing-sucking insects as exemplified by aphids.

*Example 14*

In a laboratory test to determine the effectiveness of the present chemicals against third and fourth instar yellow-fever mosquito larvae (*Aedes aegypti*), it was found that each of products I, II, III, IV, and V was an active larvicide at a concentration of 0.001% and below in aqueous media; product V gave 100% kill of the larvae at 0.0005% concentration, and better than 75% kill at 0.00025% concentration, for example.

The compounds of the invention are effective toxicants for the control of a wide variety of insects, and may suitably be used as agricultural chemicals for the control of insects on growing crops. Illustrations of important species of mites which attack crops and against which the present compounds may be applied are the citrus red mite, the citrus rust mite, the European red mite, the two-spotted spider mite, the apple bud mite, etc. Other species of insects against which the compounds of the invention may be used in agricultural practice include sucking insects such as the pea aphid or the green chrysthemum aphid, as well as the chewing larvae of beetles, e. g., the Colorado potato beetle, moths, e. g., the codling moth, etc.

The present compounds may usefully be applied directly to the insects, or they may be applied to the fruit or foliage of plants or other potential hosts in advance of the anticipated infestation. Contact of the parasiticides of the invention with the plants which are to be protected from insect pests results in absorption of the compounds by the plant, whereby the entire plant system is rendered pestproof. Only very low concentrations of the active toxicant need be used to produce insecticidal effects; amounts sufficient to exert the desired insecticidal action may be, e. g., from 0.005% to 3%, depending on the severity of the infection and the choice of toxicant. For the convenient application of these low percentages, suitably the active ingredient is applied in an inert carrier. Oil-in-water emulsions of these toxicants, prepared as described above, are highly suitable compositions for application to crops and have been found to possess unexpectedly superior insecticidal activity. The compositions incorporating the present insecticides may also, if desired, include other active pesticides, such as fungicides, etc.

It is to be noted that, as employed in the present specification, the term "insect" is herein used to include mites, in addition to other allied classes of arthropods, such as spiders, centipedes, etc., as well as true hexapoda.

What is claimed is:

1. The phosphorus-containing product of the reaction of an adduct in which one mole of trithiane is combined with from one to three moles of sulfenyl chloride of formula R'SCl in which R' is a hydrocarbon radical of from one to eight carbon atoms which is free of non-benzenoid unsaturation and which contains at least one substituent selected from the class consisting of halogen and the nitro radical, with from one to five moles per mole of said sulfenyl chloride of a trivalent phsophorus acid ester of the formula:

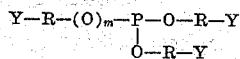

wherein *m* is a cardinal number not greater than one, R is a bivalent hydrocarbon radical selected from the class consisting of lower alkyl, cyclohexyl and aryl, aralkyl and alkaryl radicals containing not more than ten carbon atoms, and Y is selected from the class consisting of hydrogen and chlorine atoms.

2. The phosphorus-containing product of the reaction of an adduct in which one mole of trithiane is combined with from one to three moles of a chloro-substituted sulfenyl chloride of the formula R'SCl in which R' is a hydrocarbon radical of from one to eight carbon atoms which is free of non-benzenoid unsaturation and which contains at least one halogen substituent, with from one to five moles per mole of said sulfenyl chloride of a trivalent phosphorus acid ester of the formula:

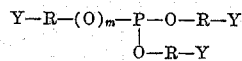

wherein *m* is a cardinal number not greater than one, R is a bivalent hydrocarbon radical selected from the class consisting of lower alkyl, cyclohexyl and aryl, aralkyl and alkaryl radicals containing not more than ten carbon atoms, and Y is a hydrogen atom.

3. The phosphorus-containing product of the reaction of an adduct in which one mole of trithiane is combined with from one to three moles of trichloromethanesulfenyl chloride, with from one to five moles per mole of said sulfenyl chloride of triethyl phosphite.

4. The phosphorus-containing product of the reaction of an adduct in which one mole of trithiane is combined with from one to three moles of 4-chlorobenzenesulfenyl chloride, with from one to five moles per mole of said sulfenyl chloride of triethyl phosphite.

5. The phosphorus-containing product of the reaction of an adduct in which one mole of trithiane is combined with from one to three moles of trichloromethanesulfenyl chloride, with from one to five moles per mole of said sulfenyl chloride of trimethyl phosphite.

6. The phosphorus-containing product of the reaction of an adduct in which one mole of trithiane is combined with from one to three moles of 4-chlorobenzenesulfenyl chloride, with from one to five moles per mole of said sulfenyl chloride of trimethyl phosphite.

7. The phosphorus-containing product of the reaction of an adduct in which one mole of trithiane is combined with from one to three moles of a chloro-substituent sulfenyl chloride of the formula R'SCl in which R' is a hydrocarbon radical of from one to eight carbon atoms which is free of non-benzenoid unsaturated and which contains at least one halogen substituent, with from one to five moles per mole of said sulfenyl chloride of a trivalent phosphorus acid ester of the formula:

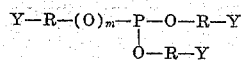

wherein *m* is a cardinal number not greater than one, R is a bivalent hydrocarbon radical selected from the class consisting of lower alkyl, cyclohexyl and aryl, aralkyl and alkaryl radicals containing not more than ten carbon atoms, and Y is a chlorine atom.

8. The phosphorus-containing product of the reaction of an adduct in which one mole of trithiane is combined with from one to three moles of trichloromethanesulfenyl chloride, with from one to five moles per mole of said sulfenyl chloride of tris(2-chloroethyl) phosphite.

9. The method which comprises contacting trithiane with a sulfenyl chloride of the formula R'SCl in which R' is a hydrocarbon radical of from one to eight carbon atoms which is free of non-benzenoid unsaturation and which contains at least one substituent selected from the class consisting of halogen and the nitro radical, forming an adduct in which one mole of trithiane is combined with from one to three moles of the said sulfenyl chloride, contacting the said adduct with a trivalent phosphorus acid ester of the formula

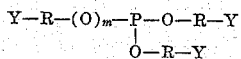

wherein *m* is a cardinal number not greater than one, R is a bivalent hydrocarbon radical selected from the class consisting of lower alkyl, cyclohexyl and aryl, aralkyl and alkaryl radicals containing not more than ten carbon atoms, and Y is selected from the class consisting of hydrogen and chlorine atoms, and isolating from the resulting reaction mixture a phosphorus-containing reaction product in which from one to five moles of the said trivalent phosphorus acid ester are reacted with the said adduct per mole of the said sulfenyl chloride present in the said adduct.

10. The method which comprises contacting trithiane with a chloro-substituted sulfenyl chloride of the formula R'SCl in which R' is a hydrocarbon radical of from one to eight carbon atoms which is free of non-benzenoid unsaturation and which contains at least one halogen substituent, forming an adduct in which one mole of trithiane is combined with from one to three moles of the said sulfenyl chloride, contacting the said adduct with a trivalent phosphorous acid ester of the formula

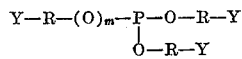

wherein $m$ is a cardinal number not greater than one, R is a bivalent hydrocarbon radical selected from the class consisting of lower alkyl, cyclohexyl and aryl, aralkyl and alkaryl radicals containing not more than ten carbon atoms, and Y is a hydrogen atom, and isolating from the resulting reaction mixture a phosphorus-containing reaction product in which from one to five moles of the said trivalent phosphorus acid ester are reacted with the said adduct per mole of the said sulfenyl chloride present in the said adduct.

11. The method which comprises contacting trithiane with trichloromethanesulfenyl chloride, forming an adduct in which one mole of trithiane is combined with from one to three moles of the said trichloromethanesulfenyl chloride, contacting the said adduct with triethyl phosphite, and isolating from the resulting reaction mixture a phosphorus-containing reaction product in which from one to five moles of the said phosphite are reacted with the said adduct per mole of the said trichloromethane sulfenyl chloride present in the said adduct.

12. The method which comprises contacting trithiane with trichloromethanesulfenyl chloride, forming an adduct in which one mole of trithiane is combined with from one to three moles of the trichloromethanesulfenyl chloride, contacting the said adduct with trimethyl phosphite, and isolating from the resulting reaction mixture a phosphorus-containing reaction product in which from one to five moles of the said phosphite are reacted with the said adduct per mole of the said sulfenyl chloride present in the said adduct.

13. The method which comprises contacting trithiane with trichloromethanesulfenyl chloride, forming an adduct in which one mole of trithiane is combined with from one to three moles of the trichloromethanesulfenyl chloride, contacting the said adduct with tris(2-chloroethyl) phosphite, and isolating from the resulting reaction mixture a phosphorus-containing product in which from one to five moles of the said phosphite are reacted with the said adduct per mole of the said sulfenyl chloride present in the said adduct.

14. The method which comprises contacting trithiane with 4-chlorobenzenesulfenyl chloride, forming an adduct in which one mole of trithiane is combined with from one to three moles of the 4-chlorobenzenesulfenyl chloride, contacting the said adduct with triethyl phosphite, and isolating from the resulting reaction mixture a phosphorus-containing product in which from one to five moles of the said phosphite is reacted with the said adduct per mole of the said sulfenyl chloride present in the said adduct.

15. The method which comprises contacting trithiane with 4-chlorobenzenesulfenyl chloride, forming an adduct in which one mole of trithiane is combined with from one to three moles of the 4-chlorobenzenesulfenyl chloride, contacting the said adduct with trimethyl phosphite, and isolating from the resulting reaction product a phosphorus-containing product in which from one to five moles of the said phosphite is reacted with the said adduct per mole of the said sulfenyl chloride present in the said adduct.

16. An insecticidal composition comprising an inert carrier and as the essential effective ingredient the phosphorus-containing product of the reaction of an adduct in which one mole of trithiane is combined with from one to three moles of a sulfenyl chloride of the formula R'SCl in which R' is a hydrocarbon radical of from one to eight carbon atoms which is free of non-benzenoid unsaturation and which contains at least one substituent selected from the class consisting of halogen and the nitro radical, with from one to five moles per mole of said sulfenyl chloride of a trivalent phosphorus acid ester of the formula:

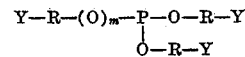

wherein $m$ is a cardinal number not greater than one, R is a bivalent hydrocarbon radical selected from the class consisting of lower alkyl, cyclohexyl and aryl, arylalkyl and alkaryl radicals containing not more than ten carbon atoms, and Y is selected from the class consisting of hydrogen and chlorine atoms.

17. An insecticidal composition comprising an oil-in-water emulsion containing a toxic quantity of the phosphorus-containing product of the reaction of an adduct in which one mole of trithiane is combined with from one to three moles of a sulfenyl chloride of the formula R'SCl in which R' is a hydrocarbon radical of from one to eight carbon atoms which is free of non-benzenoid unsaturation and which contains at least one substituent selected from the class consisting of halogen and the nitro radical, with from one to five moles per mole of said sulfenyl chloride of a trivalent phosphorus acid ester of the formula:

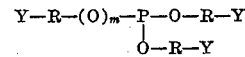

wherein $m$ is a cardinal number not greater than one, R is a bivalent hydrocarbon radical selected from the class consisting of lower alkyl, cyclohexyl and aryl, aralkyl and alkaryl radicals containing not more than ten carbon atoms, and Y is selected from the class consisting of hydrogen and chlorine atoms.

18. The method of destroying insect pests which comprises exposing said insects to a toxic quantity of the phosphorus-containing product of the reaction of an adduct in which one mole of trithiane is combined from one to three moles of a sulfenyl chloride of the formula R'SCl in which R' is a hydrocarbon radical of from one to eight carbon atoms which is free of non-benzenoid unsaturation and which contains at least one substituent selected from the class consisting of halogen and the nitro radical, with from one to five moles per mole of said sulfenyl chloride of a trivalent phosphorus acid ester of the formula:

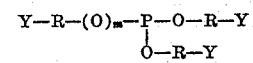

wherein $m$ is a cardinal number not greater than one, R is a bivalent hydrocarbon radical selected from the class consisting of lower alkyl, cyclohexyl and aryl, aralkyl and alkaryl radicals containing not more than ten carbon atoms, and Y is selected from the class consisting of hydrogen and chlorine atoms.

19. The method of destroying insect pests which comprises exposing said insects to a toxic quantity of the phosphorus-containing product of the reaction of an adduct in which from one mole of trithiane is combined with from one to three moles of a chloro-substituted sulfenyl chloride of the formula R′SCl in which R′ is a hydrocarbon radical of from 1 to 8 carbon atoms which is free of non-benzenoid unsaturation and which contains at least one halogen substituent, with from one to five moles per mole of said sulfenyl chloride of a trivalent phosphorus acid ester of the formula:

$$Y-R-(O)_m-\underset{\underset{O-R-Y}{|}}{P}-O-R-Y$$

wherein $m$ is a cardinal number not greater than one, R is a bivalent hydrocarbon radical selected from the class consisting of lower alkyl, cyclohexyl and aryl, aralkyl and alkaryl radicals containing not more than ten carbon atoms, and Y is a hydrogen atom.

No references cited.